US010802774B2

United States Patent
Hirose

(10) Patent No.: US 10,802,774 B2
(45) Date of Patent: Oct. 13, 2020

(54) IMAGE FORMING APPARATUS, METHOD OF CONTROLLING IMAGE FORMING APPARATUS, AND PROGRAM

(71) Applicant: CANON KABUSHIKI KAISHA, Tokyo (JP)

(72) Inventor: Fumiaki Hirose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/693,090

(22) Filed: Nov. 22, 2019

(65) Prior Publication Data

US 2020/0183625 A1    Jun. 11, 2020

(30) Foreign Application Priority Data

Dec. 5, 2018   (JP) .................................. 2018-228097

(51) Int. Cl.
*G06F 3/12*      (2006.01)
*H04N 1/00*      (2006.01)

(52) U.S. Cl.
CPC ............ *G06F 3/121* (2013.01); *G06F 3/1204* (2013.01); *G06F 3/1207* (2013.01); *G06F 3/1235* (2013.01); *G06F 3/1255* (2013.01); *H04N 1/00466* (2013.01); *H04N 1/00639* (2013.01)

(58) Field of Classification Search
CPC ...... G06F 3/121; G06F 3/1204; G06F 3/1207; G06F 3/1235; G06F 3/1255; H04N 1/00466; H04N 1/00639
See application file for complete search history.

(56) References Cited

U.S. PATENT DOCUMENTS

2006/0177255 A1 * 8/2006 Mizoi .................. G06F 3/1236
                                                    400/62
2013/0321832 A1 * 12/2013 Sugiyama .......... H04N 1/00076
                                                    358/1.13

FOREIGN PATENT DOCUMENTS

JP          2000-015897 A      1/2000

* cited by examiner

*Primary Examiner* — Quang N Vo
(74) *Attorney, Agent, or Firm* — Canon U.S.A., Inc. I.P. Division

(57) ABSTRACT

An image forming apparatus includes a feeding unit to supply a sheet, an acquiring unit, a fixing unit, a printing unit, a determining unit, and a comparing unit. The acquiring unit acquires, as a number, a remaining amount of sheets existing in the feeding unit. The fixing unit fixes a number of sheets required for a printing process per a certain unit for an accepted print job. The printing unit performs the printing process for the print job. The determining unit determines whether a restriction is imposed on interruption of the printing process for the print job. If, in comparing the remaining amount of sheets with the required number of sheets, the comparing unit determines that the remaining amount of sheets is greater than or equal to the required number of sheets, the printing unit starts the printing process for the print job regardless of whether the restriction is imposed.

17 Claims, 4 Drawing Sheets

IMAGE FORMING APPARATUS, METHOD OF CONTROLLING IMAGE FORMING APPARATUS, AND PROGRAM

BACKGROUND

Field

The present disclosure relates to an image forming apparatus, a method of controlling the image forming apparatus, and a program.

Description of the Related Art

In image forming apparatuses, such as copiers, if no paper remains in a sheet holding unit during a printing process of an original document that is scanned or print data that is received, interruption of the printing process has hitherto been performed and a screen prompting a user to supply sheets has been displayed in an operation unit to notify the user of no paper.

In contrast, even if a precedent print job is interrupted because of the occurrence of no paper during the printing process, as in the above case, a subsequent print job may be capable of being printed on sheets different from the sheets for which no paper occurs. In this case, the printing process of the subsequent print job can be performed without waiting for completion of the precedent print job. This function is called an interruption printing function in which a precedent print job is interrupted by a subsequent print job to print the subsequent print job.

However, if no paper occurs at a portion that is not a separation between sets during the printing process when a staple setting is made for a precedent print job, there is a restriction that it is not possible to interrupt the printing process of the precedent print job for the interruption printing of a subsequent print job. This is because, since output sheets waiting for stapling are held in a paper discharge port of a printer, an issue is caused in the stapling if the precedent print job is interrupted by the subsequent print job in this state for paper discharge.

In order to resolve such an issue, Japanese Patent Laid-Open No. 2000-15897 discloses a printing method in which it is predicted whether interruption of a print job occurs during output of prints because of, for example, no paper or no needle for stapling and, if it is predicted that the interruption of the print process occurs, the printing process is not started.

SUMMARY

According to an aspect of the present disclosure, an image forming apparatus includes a feeding unit configured to supply a sheet, an acquiring unit configured to acquire, as a number, a remaining amount of sheets existing in the feeding unit, a fixing unit configured to fix a number of sheets required for a printing process per a certain unit for a print job that is accepted, a printing unit configured to perform the printing process for the accepted print job, a determining unit configured to determine whether a restriction is imposed on interruption of the printing process for the accepted print job, and a comparing unit configured to compare the remaining amount of sheets with the required number of sheets, wherein, if the comparing unit determines that the remaining amount of sheets is greater than or equal to the required number of sheets, the printing unit starts the printing process for the accepted print job regardless of whether the restriction is imposed.

Further features of the present disclosure will become apparent from the following description of exemplary embodiments with reference to the attached drawings.

DESCRIPTION OF THE EMBODIMENTS

Embodiments of the present disclosure will herein be described with reference to the drawings. In an example, if it is predicted that no paper occurs during a printing process when a staple setting is made for a print job, the printing process may not be started because an interruption printing function to interrupt the print job by a subsequent print job to perform the printing process is degraded. However, when no printing process is performed, the operation efficiency of an image forming apparatus is reduced. According to the present disclosure, even if it is predicted that the print job is interrupted, the printing is performed, if possible, for each unit for which the divided printing process is permitted. Accordingly, it is possible to improve the operation efficiency of the image forming apparatus without degrading the interruption printing function.

First Embodiment

Figure 1:
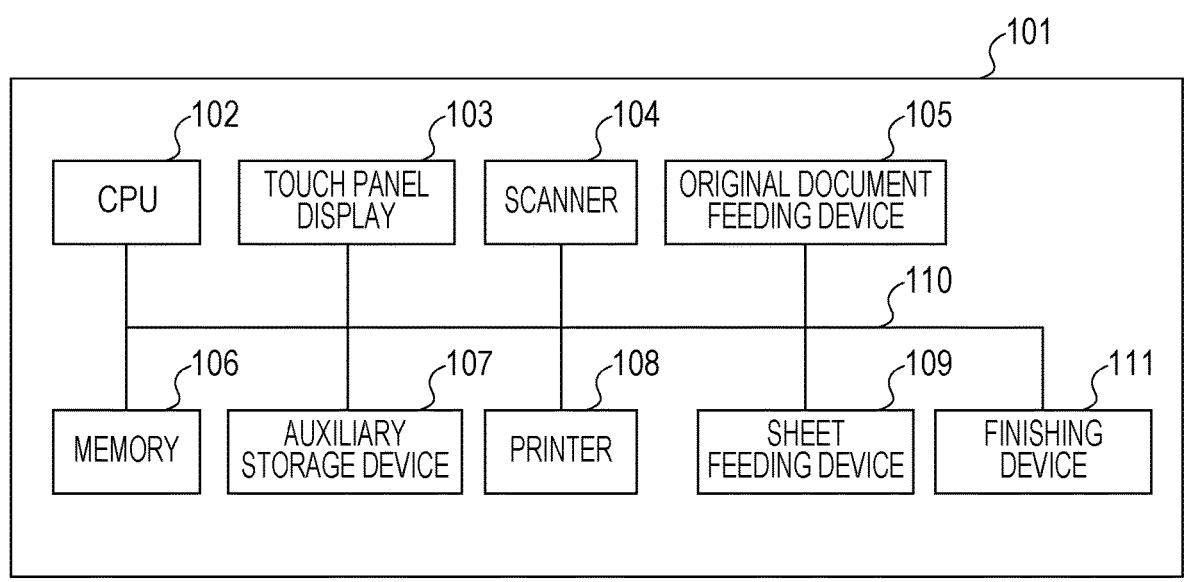
FIG. 1 illustrates a hardware configuration of an image forming apparatus of a first embodiment.

FIG. 1 illustrates a hardware configuration of an image forming apparatus 101 of a first embodiment. The image forming apparatus 101 includes devices, such as a central processing unit (CPU) 102, a touch panel display 103, a scanner 104, an original document feeding device 105, a memory 106, an auxiliary storage device 107, a printer 108, a sheet feeding device 109, and a finishing device 111. The respective devices are connected to each other via an internal bus 110.

The CPU 102 executes programs decomposed on the memory 106 and controls various devices. The touch panel display (operation unit) 103 notifies a user of, for example, information about the number of sheets remaining in the sheet feeding device 109 and accepts a key input by the user.

The scanner 104 radiates an original document with a light source and forms an image that is reflected on a solid-state imaging device with a lens. The solid-state imaging device generates an image reading signal of a certain resolution (for example, 600 dots per inch (dpi)) and a certain density level (for example, eight bits) and composes a scanned image, which is raster data, from the image reading signal. The original document feeding device 105 conveys the original document to the scanner 104.

The printer 108 prints out the scanned image decomposed on the memory 106 on a sheet of paper. The sheet feeding device 109 conveys the sheet of paper to the printer 108.

The programs to be executed by the CPU 102 are decomposed in the memory 106 and data used in the programs can be held in the memory 106. The auxiliary storage device 107 is composed of a mass storage unit, such as a hard disk drive, and stores the scanned image. The auxiliary storage device 107 also holds application programs executed by the image forming apparatus 101. Such application programs are decomposed by the CPU 102 in the memory 106 for execution.

The finishing device 111 staples the output sheets on which the scanned images are printed. The finishing device 111 will be described in detail below with reference to FIG.

Figure 2:
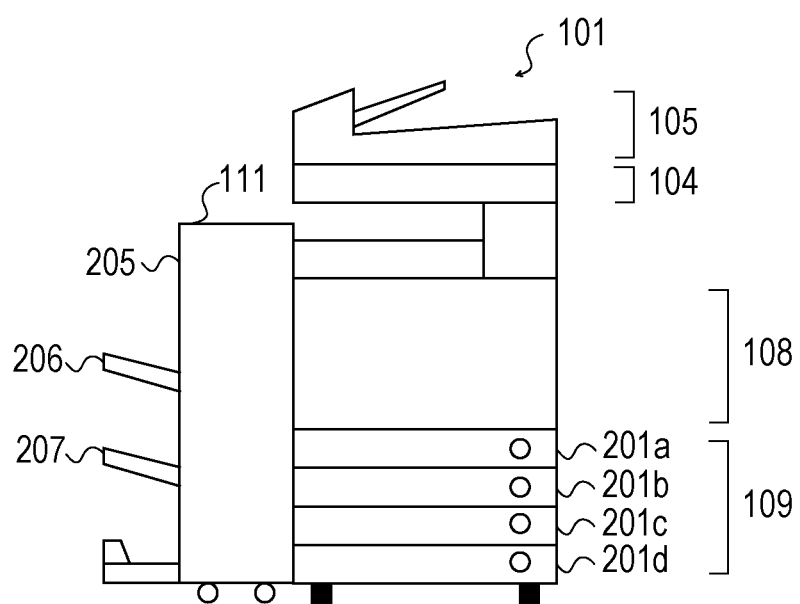
FIG. 2 is an external view of the image forming apparatus.

FIG. 2 is an external view of the image forming apparatus 101. In the image forming apparatus 101, the scanner 104 is arranged above the printer 108. The sheet feeding device 109 is provided with multiple feeders from a first paper cassette 201a to a fourth paper cassette 201d, each of which can hold 500 sheets. The sheets to be subjected to a printing process in the printer 108 are supplied from the respective paper cassettes 201a to 201d. The number of sheets (remaining amount of sheets) held in each paper cassette is measured and managed by the CPU 102 using a method described below.

The finishing device 111 is composed of a paper discharge port 205 and movable output trays 206 and 207. Either of the output trays 206 and 207 moves up and down so as to be matched with the position of the paper discharge port 205 to load the output tray 206 or 207 with the output sheets. The finishing device 111 incorporates a stapling mechanism (not illustrated), which staples the output sheets waiting at the paper discharge port 205.

<How to Measure Remaining Amount of Sheets>

An exemplary method of measuring a remaining-amount-of-sheets S in each of the paper cassettes 201a to 201d, which is performed by the CPU 102, will now be described.

The CPU 102 determines that the sheets are fully loaded if the CPU 102 senses replenishment of the sheets in a paper cassette 201n with a sensor provided in the paper cassette 201n. For example, if the CPU 102 senses that the sheets are fully loaded in the first paper cassette 201a capable of loading 500 sheets, the CPU 102 determines that 500 sheets exist in the first paper cassette 201a. Then, the CPU 102 stores in the auxiliary storage device 107 information indicating that 500 sheets exist in the first paper cassette 201a.

Then, the CPU 102 subtracts the number of sheets that are discharged from the number of sheets stored in the auxiliary storage device 107 each time the sheets are discharged. For example, when 20 sheets are discharged from the first paper cassette 201a, the CPU 102 subtracts the number of sheets (20 sheets) that are discharged from the number of sheets (500 sheets) existing in the first paper cassette 201a. As a result, the information indicating that 480 sheets exist in the first paper cassette 201a is stored in the auxiliary storage device 107.

Figure 3:
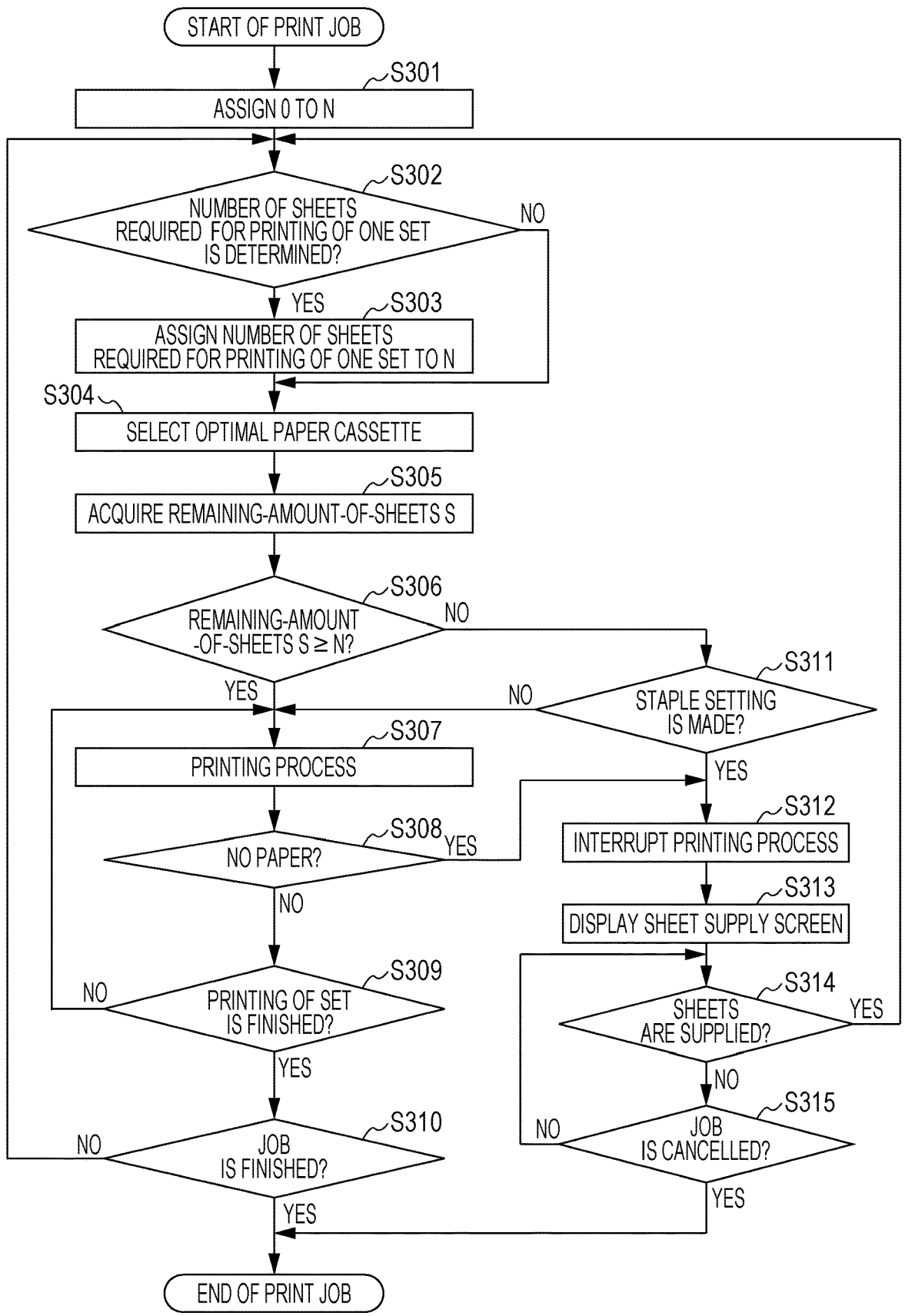
FIG. 3 is a flowchart illustrating a process to perform a print job in the first embodiment.

The CPU 102 measures the number of sheets existing in each of the paper cassettes 201a to 201d using the above method, FIG. 3 is a flowchart illustrating a process to perform a print job in the image forming apparatus 101. The flowchart in FIG. 3 is realized by decomposing the program stored in the auxiliary storage device 107 in the memory 106 and executing the decomposed program by the CPU 102.

At start of a print job, in Step S301, the CPU 102 assigns zero (0) to a variable N. The variable N indicates the number of sheets required for printing of one set for the print job that is accepted in the program executed by the CPU 102 and is managed in the memory 106.

In Step S302, the CPU 102 determines whether the number of sheets required for printing of one set for the print job that is accepted is fixed.

Upon completion of reading of the print job by the scanner 104, the number of sheets required for printing of one set is fixed. If the number of sheets required for printing of one set is fixed (YES in Step S302), in Step S303, the CPU 102 assigns the fixed number of sheets to the variable N.

If the number of sheets required for printing of one set is not fixed (NO in Step S302), the variable N is kept at zero (0). Then, the process goes to Step S304.

In Step S304, the CPU 102 selects the paper cassette (optimal paper cassette) 201n optimal to perform the print job. In Step S305, the CPU 102 acquires the remaining-amount-of-sheets S loaded in the optimal paper cassette 201n.

In Step S306, the CPU 102 compares the remaining-amount-of-sheets S acquired in Step S305 with the variable N to determine whether the remaining-amount-of-sheets S is greater than or equal to the variable N.

If the CPU 102 determines that the remaining-amount-of-sheets S is greater than or equal to the variable N, that is, if the sheets sufficient to perform the print job of at least one set remain in the optimal paper cassette 201n (YES in Step S306), the process goes to Step S307.

In Step S307, the CPU 102 extracts one sheet of paper from the optimal paper cassette 201n to perform the printing process.

In Step S308, the CPU 102 confirms whether no paper occurs in the optimal paper cassette 201n.

If no paper does not occur in the optimal paper cassette 201n (NO in Step S308), in Step S309, the CPU 102 determines whether the printing of the set is finished.

If the printing of the set is not finished (NO in Step S309), the process goes back to Step S307. The CPU 102 continues the printing process until the printing of the set is finished.

There are cases in which performing the printing process of multiple sets is set for the print job. Accordingly, if the printing of the set is finished (YES in Step S309), in Step S310, the CPU 102 determines whether the print job is finished.

If the print job is not finished (NO in Step S310), the process goes back to Step S302. If the print job is finished (YES in Step S310), the process to perform the print job is terminated.

As described above, in the first embodiment, if the sheets more than the number of sheets required to perform the print job of one set remain in the optimal paper cassette 201n in Step S306, the process does not go to Step S311 (confirmation of whether a staple setting is made) described below but goes to Step S307 (the printing process). In other words, the printing process of one set of the print job is performed regardless of whether the staple setting is made for the print job.

Accordingly, even when performing the printing process of multiple sets is set for the print job and the sheets required to perform the printing process of all the sets are not sufficiently loaded, the printing process is started. In other words, even if there is a restriction that the printing process should not be interrupted during the processing, for example, when the staple setting is made, the printing can be performed for each unit, such as a separation between sets, for which the divided printing process is permitted.

If the CPU 102 determines in Step S306 that the remaining-amount-of-sheets S is smaller than the variable N (NO in Step S306), that is, if the sheets required to perform the print job of one set does not remain in the optimal paper cassette 201*n*, the process goes to Step S311. In Step S311, the CPU 102 determines whether the staple setting is made for the print job.

If the staple setting is not made (NO in Step S311), there is no restriction on the interruption of the printing process because no issue occurs even if the printing process is interrupted in the middle of the set. Accordingly, the process goes back to Step S307 and the CPU 102 performs the printing process.

When the staple setting is not made, performing the printing as long as the sheets remain enables the operation efficiency of the image forming apparatus to be improved.

In contrast, if the staple setting is made (YES in Step S311), no paper will occur in the middle of the set if the printing process is advanced. Accordingly, in Step S312, the CPU 102 interrupts the printing process. In Step S313, the CPU 102 displays a sheet supply screen on the touch panel display 103.

Specifically, if the remaining-amount-of-sheets S is smaller than the number of sheets required for printing of one set of the print job and the staple setting is made even when the remaining-amount-of-sheets S is not zero (0), the CPU 102 performs the same processing as in the case in which no paper occurs. Since this prevents an occurrence of no paper in the middle of the set when the staple setting is made, the interruption printing function is not degraded.

In Step S314, the CPU 102 senses whether the sheets are supplied to the optimal paper cassette 201*n* by the user. If the sheets are not supplied (NO in Step S314), in Step S315, the CPU 102 senses whether the print job is cancelled.

If the print job is cancelled (YES in Step S315), the process to perform the print job is terminated.

If the print job is not cancelled (NO in Step S315) and the sheets are supplied (YES in Step S314), the process goes back to Step S302. The steps until the sheets are supplied or the print job is cancelled since no paper has occurred are the same as those in related art.

If no paper occurs in Step S308 (YES in Step S308), the process goes to Step S312 and the CPU 102 interrupts the printing process.

In the first embodiment, since the number of sheets required for printing of one set is not fixed (NO in Step S302) when the reading of the print job by the scanner 104 is not finished, the variable N is kept at zero (0).

As a result, when the reading of the print job by the scanner 104 is not finished, the determination in Step S306 is constantly affirmative (YES) (the remaining amount of sheets≥N=0). In this case, Step S307 (the printing process) is performed.

Accordingly, even when the staple setting is made, no paper may occur (YES in Step S308) while the printing process is continued and the printing process may be interrupted in the middle of the set until the scanning is completed. In this case, a state is made in which the print job cannot be interrupted by a subsequent print job.

A process to resolve this state will be described in a second embodiment.

Second Embodiment

Figure 4:
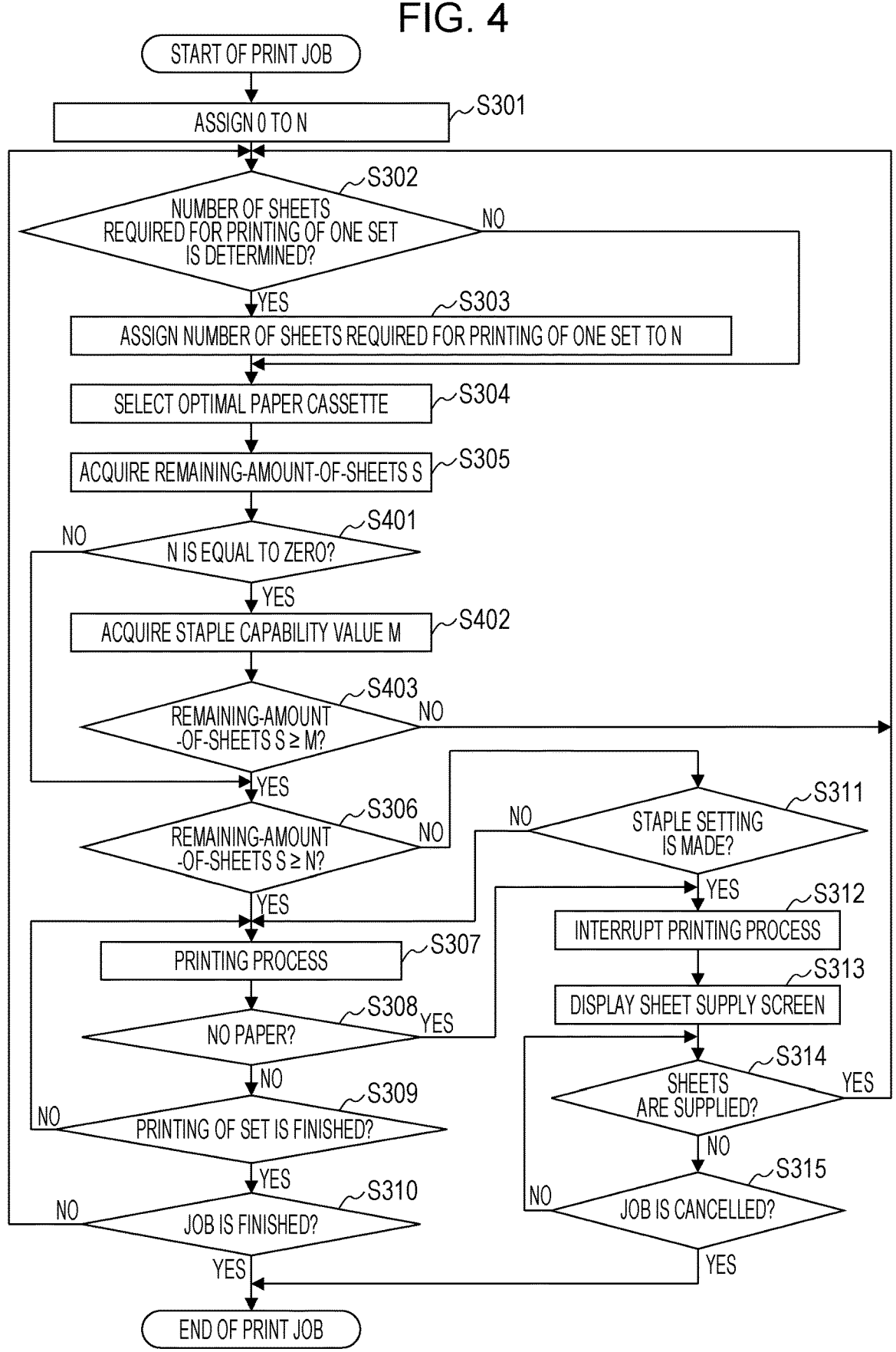
FIG. 4 is a flowchart illustrating a process to perform a print job in a second embodiment.

FIG. 4 is a flowchart illustrating a process to perform a print job in the image forming apparatus 101 in the second embodiment. The flowchart in FIG. 4 is also realized by decomposing the program stored in the auxiliary storage device 107 in the memory 106 and executing the decomposed program by the CPU 102.

The flowchart in FIG. 4 differs from the flowchart in the first embodiment illustrated in FIG. 3 in that Steps S401 to S403 are added. The difference from the flowchart in FIG. 3 will be mainly described below.

After the remaining-amount-of-sheets S is acquired in Step S305, as in the first embodiment, in Step S401, the CPU 102 determines whether the variable N is equal to zero (0).

If the variable N is equal to zero (0) (YES in Step S401), in Step S402, the CPU 102 acquires a staple capability value M. The staple capability value M indicates the maximum number of sheets that can be stapled at one time in the stapling mechanism in the finishing device 111.

The staple capability value M is differentiated depending on the staple type (with needles or without needles) supported by the finishing device 111. For example, the staple capability value M is equal to 50 when the finishing device 111 performs the stapling with needles and is equal to five when the finishing device 111 performs eco stapling without needles.

When the staple setting is made and an M-number sheets subjected to the printing process are discharged, the CPU 102 instructs the finishing device 111 to forcedly perform the stapling even if the printing process of the set is not finished. Accordingly, the sheets subjected to the printing process are subjected to the stapling for each maximum number of sheets that can be stapled at one time, that is, for each staple capability value.

In Step S403, the CPU 102 determines whether the remaining-amount-of-sheets S is greater than or equal to the staple capability value M.

If the remaining-amount-of-sheets S is smaller than the staple capability value M (NO in Step S403), the process goes back to Step S302 and the CPU 102 waits for fixing of the number of sheets required for printing of one set, that is, completion of the scanning for all the original documents.

If the remaining-amount-of-sheets S is greater than or equal to the staple capability value M (YES in Step S403), the process goes to Step S306. Since the variable N is equal to zero (0) (YES in Step S306) when the scanning is not completed, in Step S307, the CPU 102 performs the printing process.

As described above, in the second embodiment, when the remaining-amount-of-sheets S is smaller than the staple capability value M, the scanning by the scanner 104 is completed to fix the number of sheets N required for printing of one set and the printing process is performed only if the remaining-amount-of-sheets S is greater than or equal to the variable N.

Accordingly, when the staple setting is made, it is possible to reliably prevent the printing process from being interrupted in the state in which no paper occurs in the middle of the set and the print job cannot be interrupted by the subsequent print job.

OTHER EMBODIMENTS

The staple setting is exemplified in the above embodiment as a restriction that forces the printing for each certain unit because of the printing process that cannot be interrupted during the printing process in order not to degrade the interruption printing function.

However, such a restriction is not limited to the staple setting and, for example, may be a punching setting. Such a restriction can be appropriately imposed with settings of the print job or settings in the image forming apparatus.

Although the set (one set) of the print job is exemplified in the above embodiments as the certain unit in which the printing process cannot be interrupted during the printing process, the certain unit is not limited to the set. For example, the unit may be set for each certain section in the set, for example, which occurs at a separation between the print jobs.

The present disclosure can be realized by a process in which the programs realizing one or more functions in the above embodiments are supplied to a system or an apparatus via a network or a storage medium and one or more processors in the computer of the system or the apparatus read out and execute the programs. In addition, the present disclosure can be realized by a circuit (for example, an application specific integrated circuit (ASIC)) realizing one or more functions.

Furthermore, the present disclosure may be applied to a system composed of multiple devices or an apparatus composed of one device.

The present disclosure is not limited to the above embodiments. Various modifications may be made based on the spirit of the present disclosure and the modifications should not be excluded from the range of the present disclosure. In other words, all the configurations resulting from combinations of the above embodiments and the modifications of the embodiments are included in the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-228097, filed on Dec. 5, 2018, which is hereby incorporated by reference herein in its entirety.

What is claimed is:

1. An image forming apparatus comprising:
a feeding unit configured to supply a sheet;
an acquiring unit configured to acquire, as a number, a remaining amount of sheets existing in the feeding unit;
a fixing unit configured to fix a number of sheets required for a printing process per a certain unit for a print job that is accepted;
a printing unit configured to perform the printing process for the accepted print job;
a determining unit configured to determine whether a restriction is imposed on interruption of the printing process for the accepted print job; and
a comparing unit configured to compare the remaining amount of sheets with the required number of sheets,
wherein, if the comparing unit determines that the remaining amount of sheets is greater than or equal to the required number of sheets, the printing unit starts the printing process for the accepted print job regardless of whether the restriction is imposed.

2. The image forming apparatus according to claim 1, wherein the number of sheets required for the printing process per the certain unit is a number of sheets required for the printing process of one set for the accepted print job.

3. The image forming apparatus according to claim 1, wherein the printing unit starts the printing process for the accepted print job even if the remaining amount of sheets is smaller than a number of sheets required for the printing process of the entire print job that is accepted.

4. The image forming apparatus according to claim 1, wherein the comparing unit is configured to compare the remaining amount of sheets with the required number of sheets for each certain unit.

5. The image forming apparatus according to claim 1, wherein the restriction is a setting disabling an interruption printing function.

6. The image forming apparatus according to claim 5, wherein the restriction is a staple setting.

7. The image forming apparatus according to claim 1, wherein the fixing unit is a reading unit of the print job.

8. The image forming apparatus according to claim 7, wherein the reading unit is a scanner.

9. The image forming apparatus according to claim 1, wherein, if the comparing unit determines that the remaining amount of sheets is smaller than the required number of sheets and the determining unit determines that the restriction is imposed, the printing unit does not perform the printing process for the accepted print job.

10. The image forming apparatus according to claim 9, further comprising a notifying unit configured to give a notification prompting the feeding unit to supply sheets when the printing unit does not perform the printing process for the accepted print job.

11. The image forming apparatus according to claim 1, wherein, if the determining unit determines that the restriction is not imposed even when the comparing unit determines that the remaining amount of sheets is smaller than the required number of sheets, the printing unit starts the printing process for the accepted print job.

12. The image forming apparatus according to claim 1, wherein the feeding unit includes a plurality of feeders, the image forming apparatus further comprising a selecting unit configured to select one feeder for performing the printing process for the accepted print job from the plurality of feeders.

13. The image forming apparatus according to claim 12, wherein the acquiring unit acquires a number of sheets loaded in the selected one feeder as the number of sheets.

14. The image forming apparatus according to claim 1, further comprising a stapling unit configured to staple the sheets subjected to the printing process for the accepted print job.

15. The image forming apparatus according to claim 14, wherein the number of sheets required for the printing process per the certain unit is a capability value of the stapling unit.

16. The image forming apparatus according to claim 14, wherein the stapling unit staples the sheets subjected to the printing process for the accepted print job for each capability value of the stapling unit.

17. A method of controlling an image forming apparatus having a feeding unit configured to supply a sheet and a printing unit configured to perform the printing process for the accepted print job, the method comprising:
- acquiring, as a number, a remaining amount of sheets existing in the feeding unit;
- fixing a number of sheets required for a printing process per a certain unit for a print job that is accepted;
- determining whether a restriction is imposed on interruption of the printing process for the accepted print job; and
- comparing the remaining amount of sheets with the required number of sheets,
- wherein, comparing includes determining that the remaining amount of sheets is greater than or equal to the required number of sheets, the printing unit starts the printing process for the accepted print job regardless of whether the restriction is imposed.

* * * * *